United States Patent [19]

Jiles

[11] Patent Number: 4,977,681

[45] Date of Patent: Dec. 18, 1990

[54] BORE GAUGE

[76] Inventor: Stephen L. Jiles, 1513 Dogwood Ave., Anaheim, Calif. 92801

[21] Appl. No.: 309,163

[22] Filed: Feb. 13, 1989

[51] Int. Cl.⁵ .............................................. G01B 5/12
[52] U.S. Cl. .................................. 33/544.5; 33/544.3; 33/542; 33/827
[58] Field of Search ................. 33/178 R, 178 F, 542, 33/544, 827, 544.1–544.6, 542.1, 555.1–555.4

[56] References Cited

U.S. PATENT DOCUMENTS

| | | | |
|---|---|---|---|
| 979,248 | 12/1910 | Ayers | 33/178 R |
| 1,562,923 | 11/1925 | Sisson | 33/178 R |
| 2,024,021 | 12/1935 | Aldeborgh et al. | 33/178 R |
| 2,095,405 | 10/1937 | Aldeborgh et al. | 33/178 R |
| 2,443,881 | 6/1948 | Aldeborgh et al. | 33/178 R |
| 2,590,151 | 3/1952 | Bryant et al. | 33/178 R |
| 2,720,033 | 10/1955 | Eisele | 33/178 R |
| 2,744,333 | 5/1956 | Eisele | 33/178 R |
| 2,775,820 | 1/1957 | Worthen | 33/178 R |
| 2,930,134 | 3/1960 | Bishop et al. | 33/178 R |
| 3,296,707 | 1/1967 | Eisele | 33/178 R |

FOREIGN PATENT DOCUMENTS 0230931 of 1944 Switzerland ..................... 33/178 R Primary Examiner—William A. Cuchlinski, Jr.
Assistant Examiner—C. Fulton
Attorney, Agent, or Firm—Bruce L. Birchard

[57] ABSTRACT

A bore gauge having a fixed and an opposing automatically-adjustable contact anvil, each such anvil having an extended length in the direction of the axis of the bore being gauged, the gauge having a body about which is adjustably secured a reference plate which sets the depth at which the contact anvils make contact with the inner wall of the device the bore of which is being measured, the adjustable contact anvil being mechanically coupled to the dial-actuating rod of a dial indicator for reading the bore diameter.

6 Claims, 2 Drawing Sheets

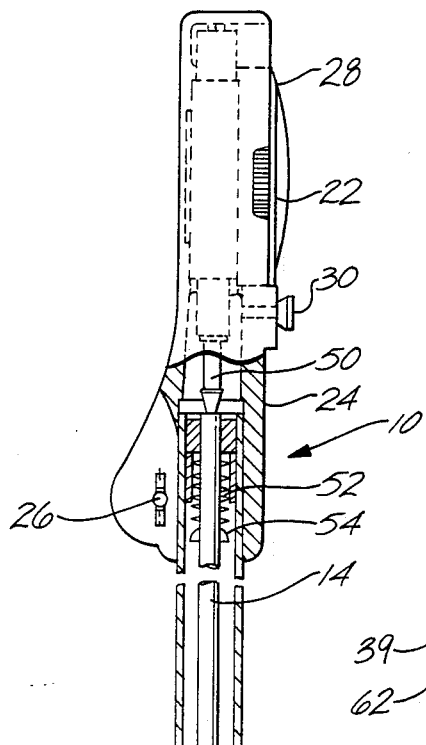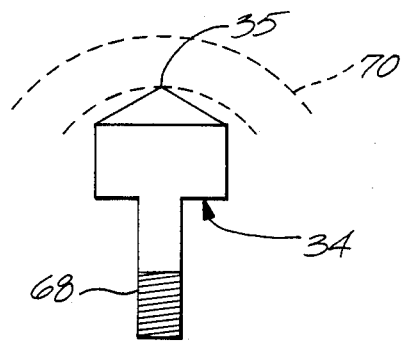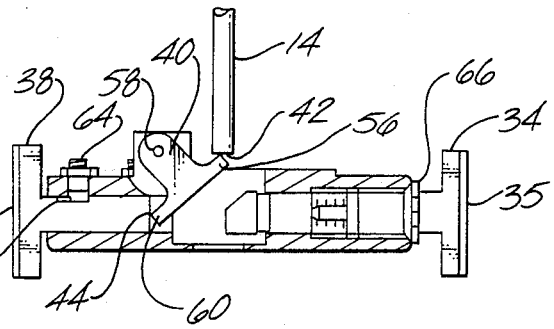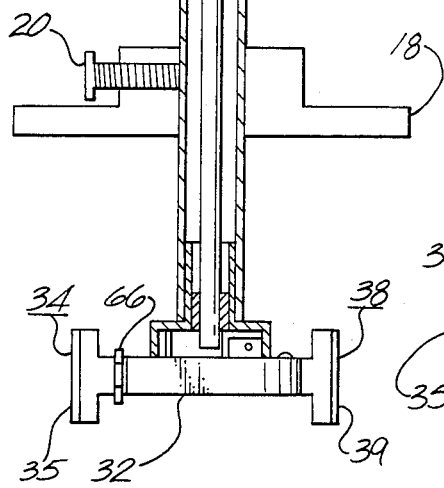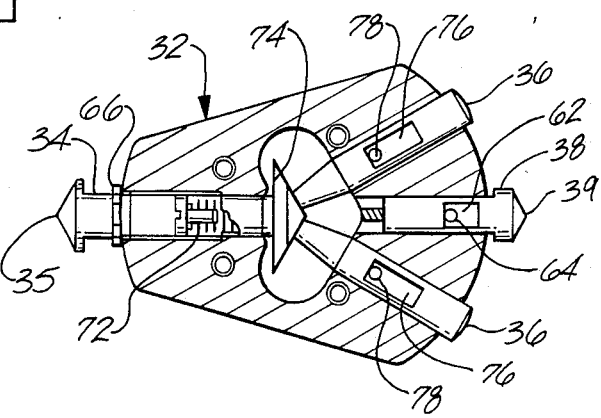

BORE GAUGE

BACKGROUND OF THE INVENTION

1. Field of the Invention.

This invention relates to gauges, and more particularly, to bore gauges for quality control applications or the like.

2. Prior Art.

The prior art is replete with various embodiments of bore measuring devices or gauges. For example, those shown in U.S. Pat. Nos. 2,720,033 (Eisele), U.S. Pat. No. 1,804,383 (Litterio), U.S. Pat. No. 1,657,326 (Steinle) U.S. Pat. No. 4,288,924 (Mizuno, et al), U.S. Pat. No. 4,507,870 (Meyer, Jr.), U.S. Pat. No. 1,658,994 (Lauer) U.S. Pat. No. 4,265,026 (Meyer), U.S. Pat. No. 2,910 781 (Bishop) and U.S. Pat. No. 3,188,744 (Bowers).

These prior art devices suffer from several deficiencies. First of all, in general, the contact anvils make point contacts with the bore wall being measured. Thus, variations in internal diameter over the length of the inner wall may exist without being detected. Further no means are provided for assuring that the internal diameter is measured at the same depth into the bore each time it is measured. In quality control applications these deficiencies may be fatal. For example, in the gas distribution industry, plastic pipes are now widely used. In joining plastic pipes it is presently common to use what is known as an "electrofusion" technique. This involves the use of an electrofusion fitting which is cylindrical in nature and has heating wires on its inner wall concentric with its own axis. The extent of intrusion of these coaxial heating wires into the central portion of the cylinder may vary from wire to wire and very close tolerances are required to effect a hermetically sealed joint between pipes With present bore gauges it is not possible to accurately check the inner diameter of such an electrofusion coupling.

Therefore, it is an object of this invention to provide an improved bore-diameter gauge which does not suffer from the deficiencies recited hereinbefore.

It is a further object of this invention to provide a bore-diameter gauge which can provide reproducible measurements which are accurate.

SUMMARY OF THE INVENTION

In the bore gauge according to my invention the elements which contact the inner wall of the device on which the bore-diameter is being measured have a length in the direction of the axis of the bore which may be one inch or more. Thus, if there are ridges on the inner surface of the wall, as, for example, when an inner wall carries an electrical winding, as is the case in an electrofusion device, the contact element or anvil spans a number of the ridges so as to assure that the narrowest diameter is measured. One of such contact members or anvils is spring biased toward the inner wall of the device having its bore measured and opposite that spring biased, movable member there is a fixed anvil of the same extent There may be, in addition, centering elements which are spring biased towards the wall of the device being measured and which are located on opposite sides of the fixed anvil The movable contact or anvil is coupled by a linkage through a center rod which drives, mechanically, a conventional dial indicator. The rod which activates the dial indicator passes through a housing of a cylindrical nature. A reference plate is carried by that housing in adjustable fashion so that the depth to which the contact anvils may enter the device, the internal diameter of which is being measured, may be adjusted to a desired depth and the reference plate locked in that position. Thus, in successive readings, the diameter of the devices being gauged will be regularly measured at the same depth within that device. If it has a taper, there will be a consistent point for measuring the internal diameter This feature is important in doing quality control or incoming inspection procedures. The cylindrical device, for example an electrofusion fitting may be rotated about its axis when it is in contact with the reference plate and a determination may be made as to whether the device is internally round.

BRIEF DESCRIPTION OF THE DRAWINGS

The nature of operation of this invention may best be understood by referring to the description which follows, which contains references to the drawings herein, in which;

FIG. 2 is a partially sectioned elevational view of the device, according to my invention;

FIG. 3 is a partially sectioned view of a portion of the device of FIGS. 1 and 2;

FIG. 4 is a partially sectioned view of a portion of the device of FIGS. 1 and 2; and, FIG. 5 is an elevational view of an element of the device of FIG. 1.

DETAILED DESCRIPTION OF THE PREFERRED EMBODIMENT

Figure 1:
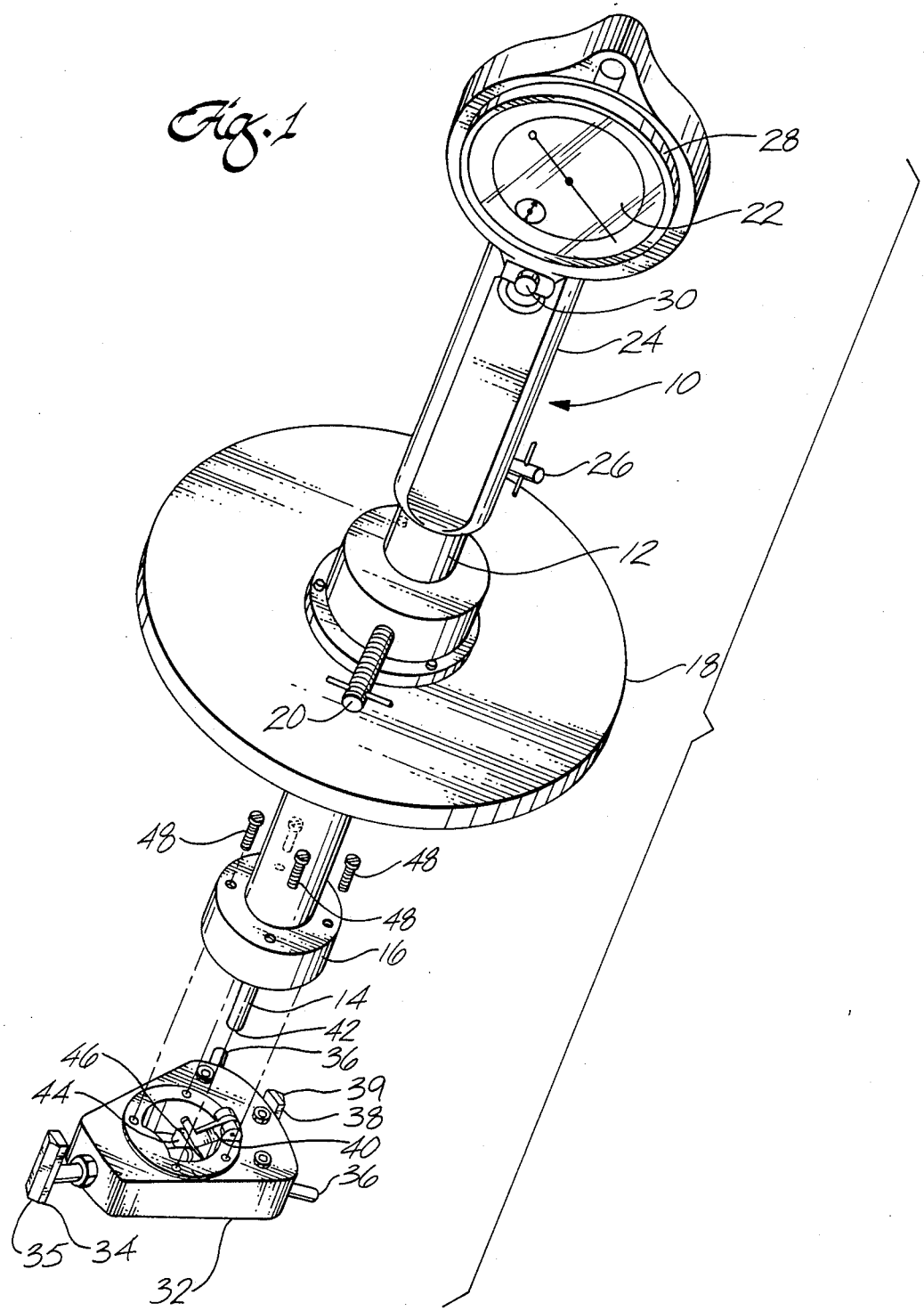
FIG. 1 is a perspective view, partially exploded of a bore-gauge, according to my invention.

In FIG. 1, bore-gauge 10 has a central cylindrical tube 12 which carries coaxially therein center rod 14. Tube 12 terminates at one end in cap 16 and carries reference plate 18 adjustably thereon. Once the desired position of reference plate 18 is chosen reference plate locking screw 20 may be tightened against tube 12 to secure the location of reference plate 18. As can be seen more clearly in FIG. 2, center rod 14 at its end not shown in FIG. 1 is coupled to the dial actuating mechanism of dial 22. A shroud 24 covers the inner coupling between center rod 14 and the dial actuating mechanism of dial 22. Shroud 24 is secured to tube 12 by shroud locking screw 26 Dial 22 has a bezel 28, thereon. Bezel 28 is secured to dial mechanism 22 by bezelscrew 30.

Shoe 32 carries, therein, a fixed anvil 34, a pair of spring-biased centralizers 36 and an adjustable-position contact anvil 38 which is spring-biased outwardly from shoe 32. Adjustable contact anvil 38, at its inner end is mechanically coupled to lever 40 which engages the tip 42 of center rod 14. Because of the mechanical intercoupling between the inner end 44 of adjustable contact anvil 38 and lever 40, when adjustable contact anvil 38 moves outwardly from shoe 32, indicating there is an increase in the diameter of the bore being measured, tip 60 of fulcrum lever 40 follows the motion of end 44 of adjustable contact anvil 38 causing fulcrum lever 40 to rotate about fulcrum 58 resulting in the lowering of tip 56 of lever 40 and a corresponding lowering of end 42 of rod 14 which is spring biased downwardly by spring 52 (FIG. 2). The result of lowering rod 14 is the displacement of dial 22 to show increased diameter of the cylinder being measured.

In operation, of course, shoe 32 is secured to cap 16 by screws 48. It should be noted that contact anvils 34 and 38 have a considerable extent in the direction of the axis of center rod 14 which corresponds to the axis of a cylindrical bore being measured Thus, if there are windings inside the device being measured, contact anvils 34 and 38, at their peak lines 35 and 39, respectively will make line contact with a number of the ridges formed by the windings so that the minimum diameter of the bore will be measured each time.

As can be seen in FIG. 2, the indicator actuator rod 50 of dial or indicator 22 engages or is engaged by center rod 14 which is biased away from indicator actuating rod 50 by spring 52, the latter being held in position by retainer 54.

As can be seen in FIG. 3, the end 42 of rod 14 which is remote from actuating rod 50 engages lever 40 at tip 56. Because rod 14 is biased toward tip 56 by spring 52 and because lever 40 is pivoted at fulcrum 58 its tip 60 forces adjustable anvil 38 outwardly until its peak line 39 engages the inner wall of the cylinder (such as an electrofusion cylinder) the diameter of which is being measured. The extent of movement of anvil 38 is limited by the combination of slot 62 in anvil 38 and stop screw 64 which is received by slot 62. The length of slot 62 is such as to permit adjustable anvil 38 to move the maximum tolerance that can be expected in the inner diameter of devices being tested. If a nominally larger diameter cylindrical product is to be tested, fixed anvil 34 is replaced by one of greater length. Fixed anvil 34 is locked in position by lock-nut 66.

In FIG. 5 the peak line 35 and the mounting threads 68 for fixed anvil 34 are shown. Threads 68 receive lock-nut 66 shown in FIG. 4. FIG. 5 shows how the anvils 34 and 38 make line contact with the inner wall of a cylindrical device 70, which may be an electrofusion form.

In FIG. 4 fixed anvil 34, adjustable anvil 38 and a pair of centralizers 36 are shown. Centralizers 36 are spring biased outwardly by spring 72 operating through conically shaped member 74 which engages both of centralizers 36. The extent of movement of centralizers 36 is limited by slots 76 in combination with set screws 78. Centralizers 36 do as their name implies, they ensure that shoe 32 is centrally positioned in the cylindrical member being measured.

While a particular embodiment has been shown and described it will be apparent to those skilled in the art that variations and modifications may be made therein without departing from the true spirit and scope of my invention. It is the purpose of the appended claims to cover all such variations and modifications.

I claim:

1. A bore gage for measuring the internal diameter of a cylindrical device, including:
   a hollow body portion having an axis;
   a dial portion carried at the first end of said body portion;
   a gaging portion carried at the opposite end of said body portion;
   a rod mechanically intercoupling said dial portion and said gaging portion and carried internally to said body portion;
   said gaging portion including a shoe extending at right angles to said axis of said hollow body portion and having a thickness;
   first and second contact anvil assemblies each comprising a shaft and an anvil carried at one end of the respective shaft at right angles thereto, said first anvil assembly having the shaft thereof carried fixedly in said shoe at right angles to said axis of said hollow body portion, said second contact anvil assembly having the shaft thereof carried movably in said shoe and extending at right angles to said axis of said hollow body portion in alignment with said shaft of said first contact anvil assembly but in the opposite direction from said shoe;
   said shafts of said first and second contact anvil assemblies each terminating at their ends remote from said shoe in a contact anvil positioned parallel to said axis of said hollow body portion and, hence, parallel to each other;
   each of said contact anvils having a length greater than the thickness of said shoe and a rectilinear contact edge which assures a line contact with the inner wall of the cylindrical device being measured, such line contact being parallel to the axis of the cylindrical device being measured, the line contacts of said anvils being diametrically opposed to each other;
   lever means carried pivotably by said shoe and mechanically intercoupling said rod and said shaft of said second contact anvil assembly;
   spring means biasing said rod in the direction of said lever means;
   said lever means being so configured and supported in said shoe that said shaft of said second contact anvil assembly moves outwardly from said shoe in response to pressure from said rod on said lever means;
   said dial portion being responsive to downward motion of said rod to display an increased bore diameter reading; and,
   adjustable positioning means carried by said body portion for setting the depth of said contact anvils in the device, the bore diameter of which is being measured.

2. Apparatus according to claim 1 which includes, in addition, centralizing means carried by said shoe.

3. Apparatus according to claim 2 in which said centralizing means includes spring-bias rods extending from said shoe along lines which are radial with respect to the bore being measured.

4. Apparatus according to claim 1 in which said body portion is a hollow cylinder and said adjustable positioning means is a disc concentric with said body portion and held in place by an adjustment locking screw.

5. Apparatus according to claim 1 in which said fixed contact anvil is selectively replaceable.

6. Apparatus according to claim 1 in which said second contact anvil assembly includes means for limiting the motion of the shaft therein to a predetermined distance.

* * * * *